United States Patent [19]

Bonnett et al.

[11] Patent Number: 4,917,435
[45] Date of Patent: Apr. 17, 1990

[54] TRUCK CAB CONSTRUCTION

[75] Inventors: Roy E. Bonnett, Birmingham; Ronald A. Carpenter, Dearborn; Stephen W. Gallagher, Birmingham, all of Mich.

[73] Assignee: Ford Motor Company, Dearborn, Mich.

[21] Appl. No.: 355,955

[22] Filed: May 23, 1989

[51] Int. Cl.$^4$ .............................................. B62D 25/00
[52] U.S. Cl. .................................... 296/190; 296/197; 296/901
[58] Field of Search ........................ 296/190, 197, 901

[56] References Cited

U.S. PATENT DOCUMENTS

| | | | |
|---|---|---|---|
| 1,834,525 | 12/1931 | Ledwinka | 296/185 |
| 2,186,689 | 1/1940 | Wendt | 296/192 |
| 2,192,075 | 2/1940 | Gresoire | 296/185 |
| 2,383,417 | 8/1945 | Renno | 296/194 |
| 2,520,074 | 8/1950 | Wernig et al. | 296/194 |
| 3,596,979 | 8/1971 | Hablitzel | 296/901 |
| 3,794,374 | 2/1974 | Manning | 296/197 |
| 4,488,732 | 12/1984 | Lehmann et al. | 296/190 |
| 4,669,565 | 6/1987 | Miki et al. | 296/190 |
| 4,695,342 | 9/1987 | Belleau et al. | 296/901 |
| 4,730,870 | 3/1988 | DeRees | 296/197 |
| 4,836,600 | 6/1989 | Miyazaki et al. | 296/197 |

Primary Examiner—Robert R. Song
Attorney, Agent, or Firm—Daniel M. Stock; Roger L. May

[57] ABSTRACT

A truck cab (32) is disclosed as having a lower cab component (38) including a unitary, lower member (46) with a rear wall (48), a floor (50), and a toe panel (52), and as also having an upper cab component (40) including a unitary, upper member (66) having a roof (68), a pair of windshield pillars (70), and a cowl (72). An upper connection (42) connects an upper end (54) of the rear wall (48) of the lower cab component to the rear end (74) of the roof (68) of the upper component, and a lower connection (44) connects an upper end (64) of the toe panel (52) to the cowl (72) of the upper cab component. The unitary, lower and upper members (44,66) are disclosed as being made by resin transfer molding, compression molding, or sheet metal forming. With a resin transfer molded lower and upper members, an outer roof panel (104) is also utilized to cover the roof (68) of the upper member (66). The compression molded embodiment also has an outer roof panel (110) covering ribs (108) of roof (68) and having windshield pillar portions (114) connected to a cowl portion (115) to cooperate with the compression molded upper member (66) to provide the requisite strength.

17 Claims, 7 Drawing Sheets

TRUCK CAB CONSTRUCTION

TECHNICAL FIELD

This invention relates to an improved truck cab construction.

BACKGROUND ART

Truck cabs are conventionally constructed from a multitude of formed sheet metal pieces that are held by suitable fixtures for welding to each other. Normally, such assembly proceeds by first fabricating side door frames which are then welded between a floor pan and a roof to provide the occupant compartment of the truck cab. Such welded steel constructions have been utilized for many years. See, for example, the various sheet metal vehicle body constructions disclosed by U.S. Pat. Nos.: 1,608,228 Parke et al; 1,834,525 Ledwinka; 2,186,689 Wendt; 2,383,417 Renno; and 2,520,074 Wernig et al.

Attempts have previously been made to replace conventional formed sheet metal vehicle body constructions with other materials. See, for example, U.S. Pat. No. 2,192,075 Gregire which utilizes cast pieces of aluminum.

Synthetic plastic materials have also previously been utilized for vehicle body constructions such as disclosed by U.S. Pat. Nos.: 3,596,979 Hablitzel et al; 4,695,342 Belleau et al; and 4,730,870 DeRees.

DISCLOSURE OF INVENTION

The present invention provides an improved truck cab construction that is economical to manufacture and capable of being manufactured from either synthetic resin moldings or conventional formed sheet metal. The cab construction, which is also usable with other types of vehicle bodies as well as with trucks, permits installation of interior components of the occupant compartment prior to complete assembly that closes the occupant compartment. For example, the vehicle carpet, seats, hardware, occupant restraints, steering column, wiring, and trim etc. can be installed on the associated vehicle floor prior to closing of the occupant compartment. As such, the assembly time and cost is reduced as compared to installation of these interior components into the interior of the assembled cab.

In carrying out the above object, a truck cab constructed in accordance with the present invention comprises a lower cab component including a unitary, lower member having a rear wall, a floor, and a toe panel. The rear wall of the lower cab component has an upper end and also has a lower end from which the floor extends forwardly from a rear end thereof to a front end of the floor. The toe panel of the lower cab component has a lower end connected to the front end of the floor and also has an upper end to which the toe panel extends upwardly and forwardly from its lower end. An upper cab component of the truck cab includes a unitary, upper member having a roof, a pair of windshield pillars, and a cowl. The roof of the upper cab component has a rear end from which the roof extends forwardly to a front end thereof where the roof is connected at laterally spaced locations to upper ends of the windshield pillars. These windshield pillars extend downwardly from the laterally spaced upper ends thereof to laterally spaced lower ends thereof which are connected to the cowl. An upper connection of the truck cab connects the upper end of the rear wall of the lower cab component to the rear end of the roof of the upper cab component, and a lower connection of the truck cab connects the upper end of the toe panel of the lower cab component to the cowl of the upper cab component.

The truck cab construction as described above readily lends itself to manufacturing by synthetic resin moldings or by more conventional formed sheet metal. Regardless of which construction is utilized, the connection plane between the upper and lower cab components extends generally diagonally with respect to the truck cab, when viewed in a lateral direction, from its upper rear extremity to its lower front extremity where the upper and lower connections between the cab components are respectively located.

In one preferred embodiment of the truck cab, the lower and upper members are each made as a resin transfer molding with a unitary construction. This resin transfer molding is performed by positioning an inner foam core between inner and outer fiber preforms within a closed mold cavity into which the resin is transferred to complete the molding that provides the unitary construction of each truck cab member.

In the preferred construction of the resin transfer molded embodiment of the truck cab, the upper and lower connections are each provided by an adhesive bond that secures the resin transfer moldings to each other. Also, the resin transfer molded truck cab preferably includes an outer roof panel that covers the roof of the upper cab component and has an outer finished surface. This outer roof panel can be made of formed sheet metal or from sheet molding compound by a compression molding process.

In another preferred embodiment of the truck cab, the lower and upper members of the truck cab are each manufactured as unitary, compression moldings which are made by positioning sheet molding compound and resin within a mold prior to mold closing that forces the resin throughout the mold cavity to complete the molding process.

The compression molded embodiment of the truck cab also preferably has its upper and lower connections each provided by an adhesive bond that secures the compression moldings to each other. The compression molded upper member of the truck cab also preferably includes strengthening ribs. An outer roof panel covers the strengthening ribs of the roof of the upper cab component and has an outer finish surface. This outer roof panel preferably includes windshield pillar portions that cover the windshield pillars of the upper cab component as well as including a cowl portion that connects the windshield pillar portions and covers the cowl of the upper cab component.

In a further embodiment, the truck cab has lower and upper unitary members that are each formed from sheet metal such as by a conventional stamping operation.

In the preferred construction of the sheet metal formed truck cab, the lower cab component includes inner and outer unitary members that are each formed from sheet metal and connected to each other to provide the rear wall, floor, and toe panel of the lower cab component. Likewise, the upper cab component also preferably includes inner and outer unitary members formed from sheet metal and connected to each other to provide the roof, pair of windshield pillars, and the cowl of the upper cab component. The inner and outer unitary members of both the lower cab component and the upper cab component preferably have flanges that are engaged and secured to each other with other portions thereof spaced from each other to provide strengthening of the cab components. The upper and lower connections between the formed sheet metal cab components each are preferably provided by an adhesive bond that secures the cab components to each other.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
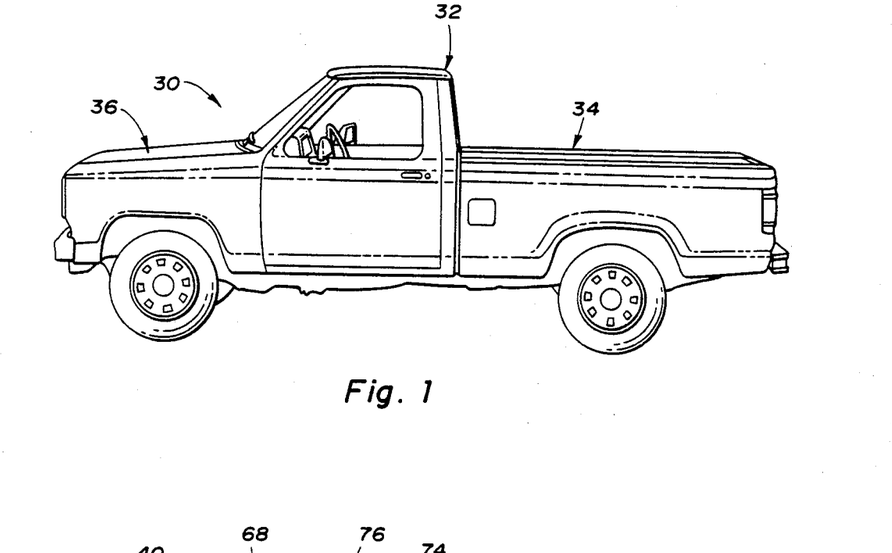
FIG. 1 is a side elevational view of a truck including a truck cab constructed in accordance with the present invention.

With reference to FIG. 1 of the drawings, a pickup truck generally indicated by 30 includes a truck cab 32 that is constructed in accordance with the present invention as is hereinafter more fully described and is located forwardly of the truck bed 34 and rearwardly of its engine compartment 36 in a conventional manner. It should be appreciated that the construction of the truck cab 32 of the truck 30 can also be utilized to construct other types of vehicles having a generally vertical rear wall in addition to the pickup truck illustrated.

Figure 2:
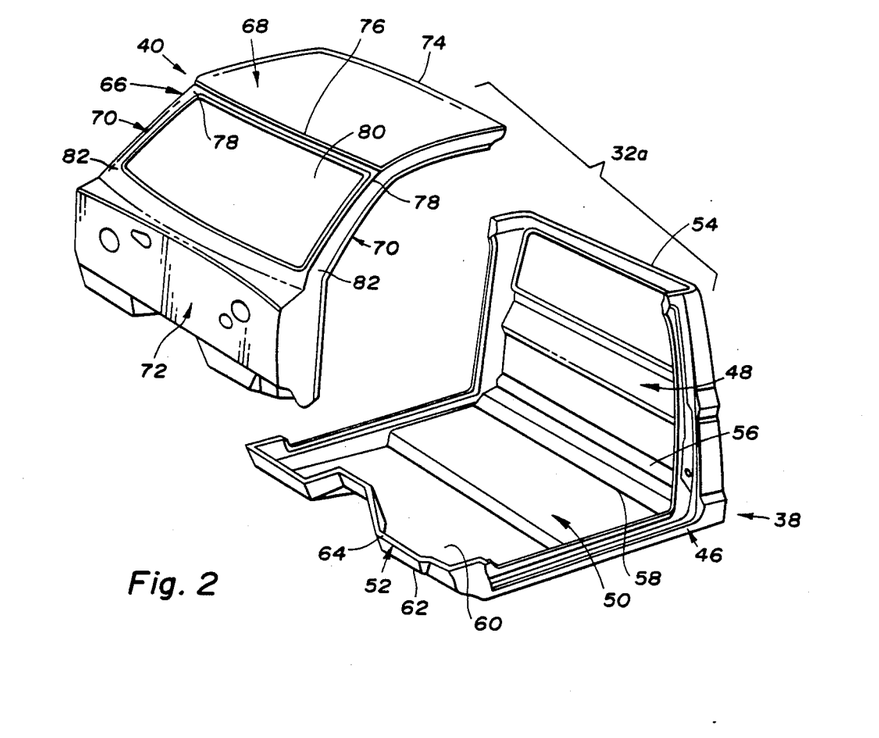
FIG. 2 is an exploded perspective view illustrating lower and upper members of one embodiment of the truck cab which is manufactured by resin transfer molding.
Figure 3:
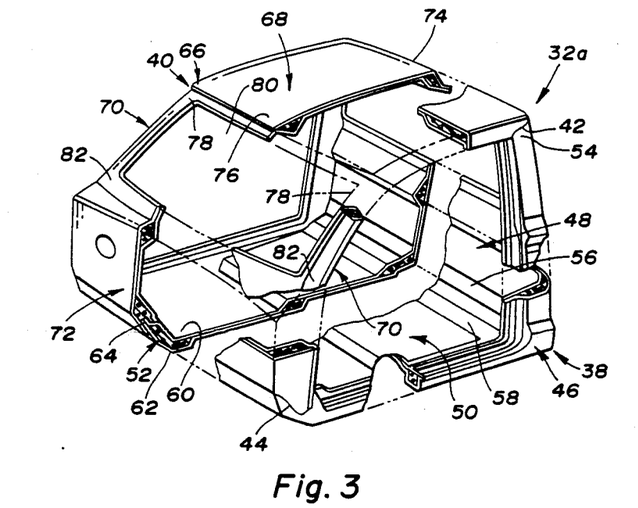
FIG. 3 is a view similar to FIG. 2 showing the lower and upper resin transfer moldings secured to each other.
Figure 4:
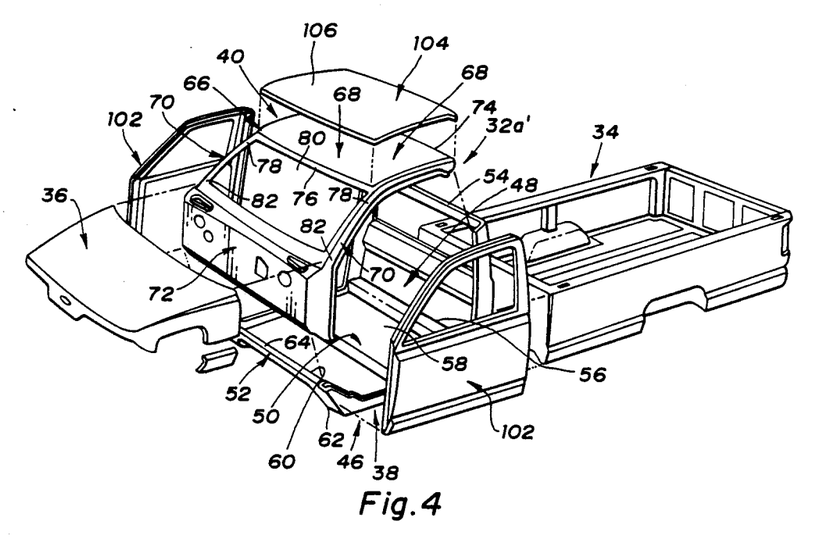
FIG. 4 is an exploded perspective view that illustrates another embodiment of the resin transfer molded truck cab.
Figure 8:
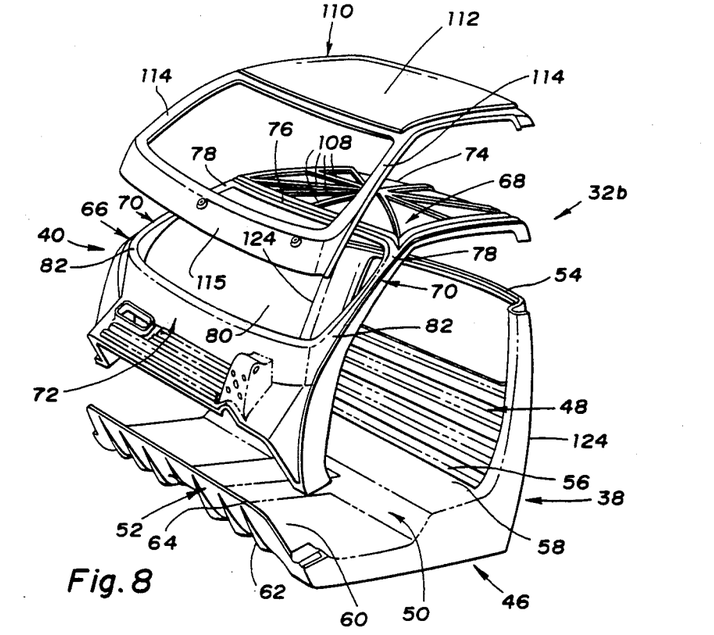
FIG. 8 is an exploded perspective view of another embodiment of the truck cab whose lower and upper components are each made as compression moldings and which also includes an outer roof panel for strengthening the upper member.
Figure 9:
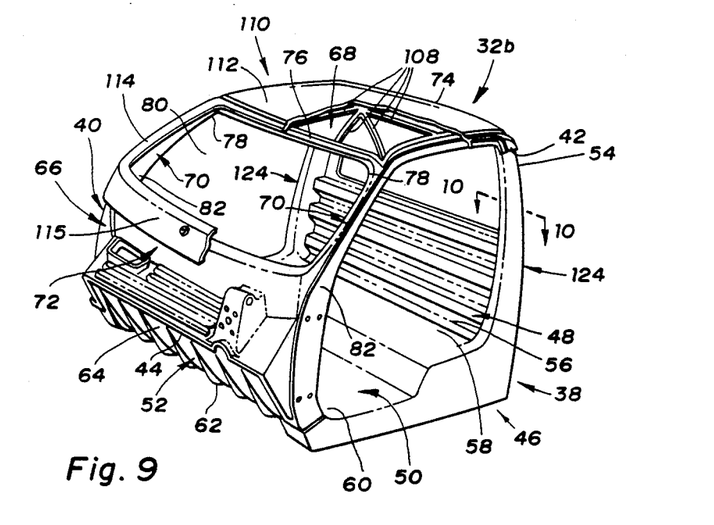
FIG. 9 is a partially broken away assembled view showing the lower and upper compression molded truck cab components secured to each other.
Figure 19:
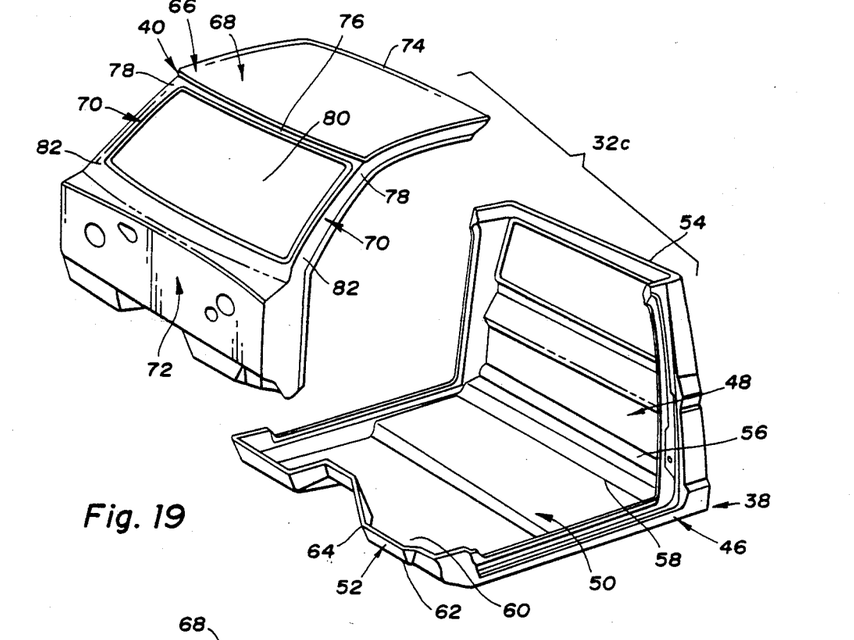
FIG. 19 is an exploded perspective view of another embodiment of the truck cab whose lower and upper cab components each are formed as unitary sheet metal members.

Different embodiments of the truck cab as illustrated in FIGS. 2 and 3 and identified by reference numeral 32a, as illustrated in FIG. 4 and identified by reference numeral 32a', as illustrated in FIGS. 8 and 9 and identified by reference numeral 32b, and as illustrated in FIG. 19 and identified by reference numeral 32c are all constructed in accordance with the present invention. Each of these truck cabs includes a lower cab component 38, an upper cab component 40, and upper and lower connections 42 and 44 that secure the cab components to each other as is hereinafter more fully described.

Each lower cab component 38 illustrated in FIGS. 2 and 3, FIG. 4, FIGS. 8 and 9, and FIG. 19 includes a unitary lower member 46 having a generally vertical rear wall 48, a floor 50, and a toe panel 52. The rear wall 48 has an upper end 54 and also has a lower end 56 from which the floor 50 extends forwardly from a rear end 58 thereof to a front end 60 of the floor. The toe panel 52 has a lower end 62 connected to the front end 60 of the floor 50 and has an upper end 64 to which the toe panel extends upwardly and forwardly from its lower end.

Each embodiment of the upper cab component 40 illustrated in FIGS. 2 and 3, FIG. 4, FIGS. 8 and 9, and FIG. 19 includes a unitary, upper member 66 having a roof 68, a pair of windshield pillars 70, and a cowl 72. The roof 68 has a rear end 74 from which the roof extends forwardly to a front end 76 of the roof. At its front end 76, the roof 68 is connected at laterally spaced locations to upper ends 78 of the windshield pillars 70. On opposite sides of the associated windshield 80, the windshield pillars 70 extend downwardly from their laterally spaced upper ends 78 to laterally spaced lower ends 82 thereof which are connected to the cowl 72.

Each embodiment of the truck cab has its upper connection 42 connecting the upper end 54 of the rear wall 48 of the lower cab component 38 to the rear end 74 of the roof 68 of the upper cab component 40. Each embodiment of the truck cab also has its lower connection 44 connecting the upper end 64 of the toe panel 52 of the lower cab component 38 to the cowl 72 of the upper cab component 40. Thus, the connected lower and upper cab components 38 and 40 when viewed from a lateral direction have a plane of connection that extends generally diagonally in a downward direction toward the front between the upper rear extremity of the truck cab, where the upper connection 42 is located, and the lower front extremity of the truck cab where the lower connection 44 is located.

Figure 7:
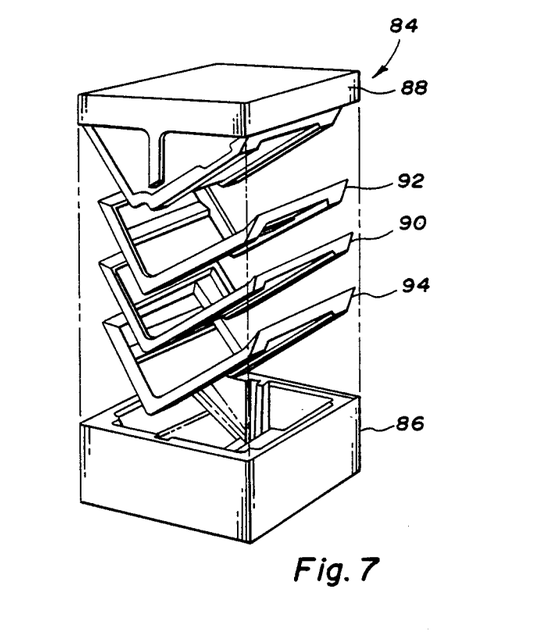
FIG. 7 is an exploded perspective view of a mold utilized to make the resin transfer moldings of the embodiments of FIGS. 2 through 5.

The two embodiment of the truck cab 32a and 32a' respectively illustrated by FIGS. 2 and 3 and by FIG. 4 each has both its lower member 46 and its upper member 66 made as a unitary resin transfer molding with the constructions previously described. Such resin transfer moldings are manufactured as illustrated in FIG. 7 utilizing a mold 84 having a female mold member 86 and a male mold member 88. Closing of the mold members 86 and 88 defines a cavity of the shape of the member to be molded. Prior to this closing, a closed cell foam core 90 is inserted between the mold members 86 and 88 with inner and outer glass fiber preforms 92 and 94 located on its opposite sides. Thus, the mold 84 is closed with the foam core 90 and the glass fiber preforms 92 and 94 located within its cavity into which a suitable synthetic resin is transferred to thereby provide the resin transfer molding that molds the core and preforms into a unitary member. It should be noted that any closed cell foam that is inert to the resin utilized can be used for the preform so long as it has sufficient strength not to deform under the resin pressure which is normally about 40 to 150 pounds per square inch. Closed cell polyurethanes meet these requirements as do polypropylenes. The synthetic resin utilized can be a vinyl ester resin which is thermosetting.

Figure 5:
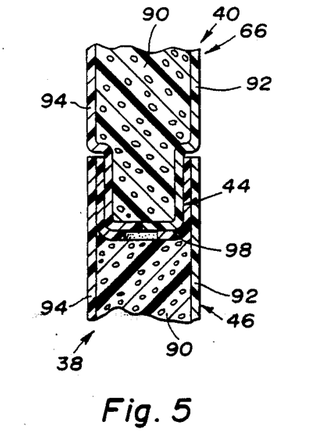
FIGS. 5 and 6 are sectional views that respectively illustrate lower and upper connections between the lower and upper cab components of the truck cab embodiments illustrated in FIGS. 2 through 4.
Figure 6:
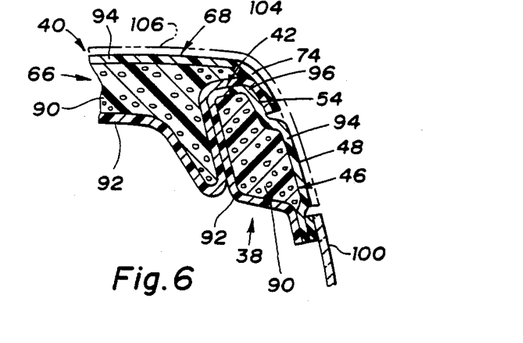

As shown in FIGS. 5 and 6, both the upper and lower connections 42 and 44 are preferably provided by adhesive bonds that are indicated by 96 for the upper connection and by 98 for the lower connection. These adhesive bonds 96 and 98 thus secure the resin transfer moldings that embody the lower member 46 and the upper member 66 of the truck cab components so as to provide the assembled truck cab. It will be noted that both the upper connection 42 and the lower connection 44 are illustrated as having formations that interfit with each other so as to provide the desired location of the lower and upper members with respect to each other. More specifically, the lower connection 44 as illustrated in FIG. 5 has a tongue-and-groove type connection at which the adhesive bond 98 provides securement between the lower member 46 and the upper member 66 at the front lower extremity of the truck cab. Likewise, the upper connection 42 illustrated in FIG. 6 is provided by a downwardly opening shape of the upper member 66 into which the upper end 54 of the rear wall of the lower member 46 is received just above the rear window 100 of the truck cab.

With reference to FIG. 4, another embodiment of the truck cab 32a' has the same construction as the truck cab embodiment 32a illustrated in FIGS. 2 and 3 with its lower and upper unitary members made as resin transfer moldings. This view also better illustrates the truck bed 34 and the hood for the engine compartment 36 which are respectively located to the rear and to the front of the truck cab 32a' between the pair of side doors 102 illustrated. Truck cab 32a' also includes an outer roof panel 104 for covering the roof 68 of the resin transfer molded upper member 66 of the upper cab component 40. This outer roof panel 104 has an outer finish surface 106 for providing an aesthetically appealing appearance which is not presently possible with conventional resin transfer molding processes. The outer roof panel 104 can be formed from sheet metal and then painted or can be formed from sheet molding compound as a compression molding with either suitable coloring of the resin used on the sheet molding compound or subsequent painting.

With reference to FIGS. 8 and 9, the truck cab embodiment 32b has its lower and upper cab components 38 and 40 provided with unitary lower and upper members 46 and 66 of generally the same construction previously described in connection with the two embodiments that are made by resin transfer molding as illustrated in FIGS. 1 through 9. As such, the truck cab embodiment 32b has the various components of the lower and upper cab components identified by the same reference numerals. However, the truck cab 32b has its unitary lower member 46 of the lower cab component 38 and the unitary upper member 66 of the upper cab component 40 each made as a compression molding as opposed to being made as a resin transfer molding in accordance with the previously described embodiments.

The compression molded truck cab 32b illustrated in FIGS. 8 and 9 thus has its lower cab component 38 provided with a unitary lower member 46 made as a compression molding with a rear wall 48, a floor 50, and a toe panel 52. The rear wall 48 has an upper end 54 and also has a lower end 56 from which the floor 50 extends forwardly from a rear end 58 thereof to a front end 60 of the floor. The toe panel 52 has a lower end 62 connected to the front end 60 of the floor 50 and also has an upper end 64 to which the toe panel extends upwardly and forwardly from its lower end.

The truck cab 32b illustrated in FIGS. 8 and 9 has its upper cab component 40 provided with a unitary, compression molded upper member 66 having a roof 68, windshield pillars 70, and a cowl 72. The roof 68 has a rear end 74 from which the roof extends forwardly to a front end 76 thereof which is connected at laterally spaced locations to upper ends 78 of the windshield pillars 70. These windshield pillars 70 extend downwardly from the laterally spaced upper end 78 thereof on opposite sides of the windshield 80 to laterally spaced lower ends 82 thereof which are connected to the cowl 72.

Figure 13:
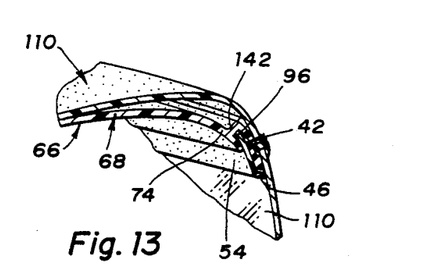
FIG. 13 is a partial perspective view taken in section to illustrate the construction of the upper truck cab component at the upper connection thereof to the lower truck cab component adjacent its rear window.

As illustrated in FIG. 13, the upper connection 42 connects the upper end 54 of the rear wall of the lower cab component to the rear end 74 of the roof 68 of the upper cab component. Likewise, as illustrated in FIG. 15, the lower connection 44 connects the upper end 60 of the toe panel 52 of the lower cab component to the cowl 72 of the upper cab component.

Figure 15:
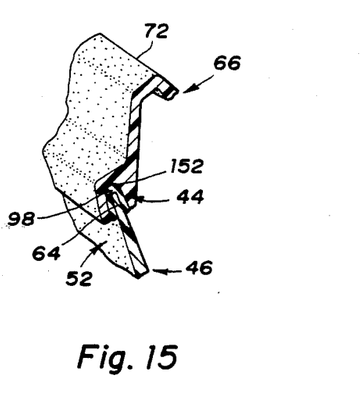
FIG. 15 is a partial perspective view taken in section to illustrate the lower connection between an upper end of a toe panel of the lower cab component and a cowl of the upper cab component.

Both the upper connection 42 illustrated in FIG. 13 and the lower connection 44 illustrated in FIG. 15 are preferably embodied by adhesive bonds that are respectively identified by 96 and 98 and which cooperate to secure the compression moldings to each other.

With reference to both FIGS. 8 and 9, the roof 68 of the upper member 66 preferably includes strengthening ribs 108. As illustrated, there are eight of these strengthening ribs extending outwardly from a center junction at approximately 45° intervals to each other. An outer roof panel 110 is also preferably provided to cover the strengthening ribs 108 and the rest of the roof 68. This outer roof panel 110 has an outer finished surface 112 and is also most preferably made as a compression molding like the compression molded lower and upper members 46 and 66 previously described. Outer roof panel 110 also preferably includes windshield pillar portions 114 that cover the windshield pillars 70 of the upper member 66 and cooperate therewith in providing strengthened windshield pillar constructions. A cowl portion 115 of the outer roof panel 110 connects the lower ends of the windshield pillar portions 114 and covers the cowl 72 of the unitary, upper member of the cab component.

Figure 18:
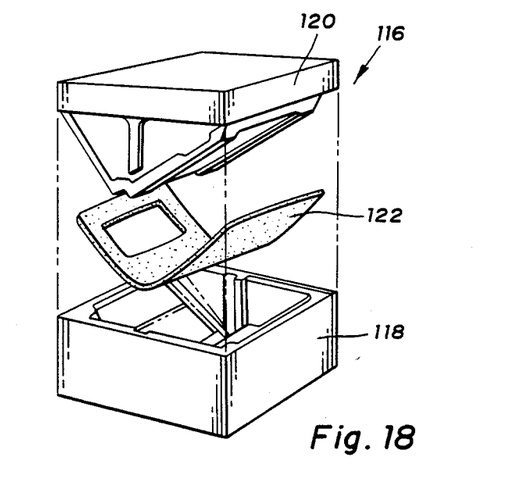
FIG. 18 is a perspective view that illustrates the manner in which sheet molding compound is located between open mold sections to perform the compression molding that forms both the lower and upper members as well as the outer roof panel illustrated in FIGS. 8 through 17.

Each of the compression moldings 46, 66, and 110 illustrated in FIGS. 8 and 9 is molded generally as illustrated in FIG. 18 by a compression mold 116 including a female mold 118 and a male mold 120. Sheet molding compound as illustrated by 122, includes a glass fiber cloth onto which resin is previously applied in a conventional manner. The resin used may be either thermosetting such as a vinyl ester resin or thermoplastic such as polypropylene resins. This resin is deposited on glass fibers that may be either woven as cloth or deposited in strands as a sheet.

Sheet molding compound 122 as shown in FIG. 18 is placed between the open female and male molds 118 and 120 of mold 116. Subsequent closing of the mold 116 compresses the resin on the sheet molding compound 122 and thereby causes the resin to flow and fill the shape of the cavity in accordance with conventional compression molding processes.

Figure 10:
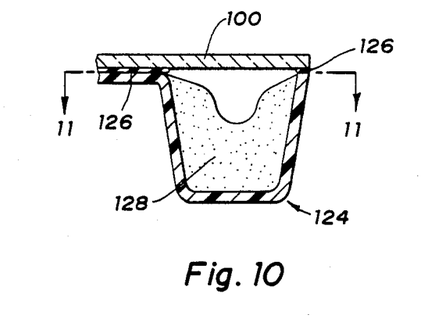
FIG. 10 is a sectional view taken generally along the direction of line 10—10 in FIG. 9 to illustrate the construction of a rear pillar of the truck cab.
Figure 11:
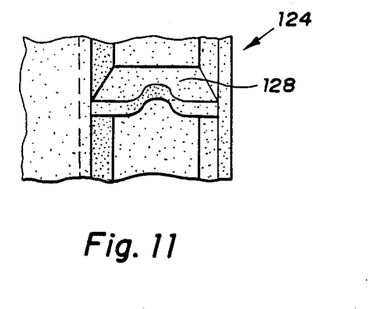
FIG. 11 is a rear view of the rear pillar taken along the direction of line 11—11 in FIG. 10.

Each lateral side of the truck cab rear wall 48 illustrated in FIGS. 8 and 9 includes a vertically extending rear pillar 124 of the construction illustrated in FIGS. 10 and 11. More specifically, each rear pillar 124 has a rearwardly opening shape located forwardly of the associated rear window 100 with a sealant or adhesive 126 located therebetween. A suitable black paint or the like may be applied to the rear window 100 so that the interior of the pillar 124 is hidden from sight. Also, the interior of each pillar 124 includes vertically spaced webs 128 for strengthening its construction. These webs 128 are inclined so as to permit removal from the compression mold along the diagonal parting line along which the lower member 46 is molded between its upper rear extremity and its lower front extremity.

Figure 12:
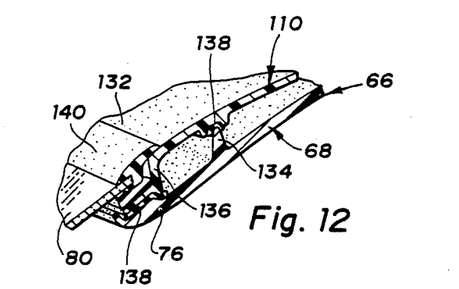
FIG. 12 is a partial perspective view taken in section to illustrate the construction of the upper truck cab component adjacent the upper edge of its windshield.

As illustrated in FIG. 12, the roof 68 of the compression molded upper member 66 has its front end 76 located in proximity to the windshield 80 below the front end 132 of the outer roof panel 110 in a slightly spaced relationship provided by a rib 134 and a flanged structure 136 that provides securement therebetween in association with adhesive bonds 138. Also, a glass edge finish member 140 on the periphery of the windshield 80 extends to and slightly over the front end 132 of the outer roof panel 110 to provide a finished appearance.

At its rear end 74 shown in FIG. 13, the roof 68 of the compression molded upper member 66 includes a downwardly opening flange construction 142 that receives the upper end 54 of the rear wall of the truck cab with the adhesive bond 96 providing securement of these components to each other.

Figure 14:
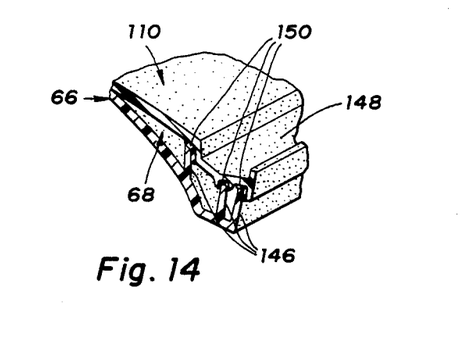
FIG. 14 is a partial perspective view taken in section to illustrate the construction of the upper truck cab component adjacent its lateral side edges.

As illustrated in FIG. 14, each lateral side of the roof 68 of the upper member 66 is provided with upwardly projecting ribs 146 that extend longitudinally with respect to the vehicle and are spaced laterally with respect thereto to cooperate in supporting the adjacent lateral edge of the outer roof panel 110 on which a rain gutter 148 is provided. Adhesive bonds 150 secure these ribs 146 to the adjacent lateral edge of the outer roof panel 110 below the rain gutter 148 and thus cooperate with the other bonds in providing a strengthened roof constructed of the upper member 66 and outer roof panel 110.

Figure 16:
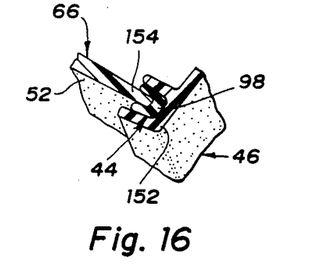
FIG. 16 is a partial perspective view taken in section to illustrate the lower connection between the toe panel and the cowl at a side edge of the toe panel.

As illustrated in FIG. 15, the upper end 64 of the toe panel 52 is secured by the adhesive bond 98 previously mentioned to the cowl 72 of the upper member 66 within a downwardly opening flange structure 152 to cooperate as a tongue-and-groove type joint to provide strengthening between the lower member 46 and the upper member 66. This flange structure 152 as illustrated in FIG. 16 also preferably extends around to each side edge 154 of the toe panel 52 as does the adhesive bond 98.

Figure 17:
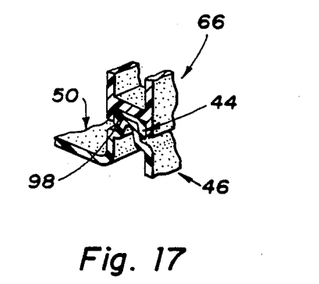
FIG. 17 is a partial perspective view taken in section to illustrate the construction of the lower connection at each lateral side of the toe panel.

With reference to FIG. 17, the lower connection 44 between the lower and upper members 46 and 66 also has the adhesive bond 98 provided at each lateral side of the cowl outwardly from the adjacent side edge of the toe panel 52 at the lateral outer edge of the floor 50.

With reference to FIG. 19, the truck cab embodiment 32c is similar to the truck cab embodiment 32a illustrated in FIGS. 2 and 3 except for the fact that its lower and upper members 46 and 66 are formed from sheet metal, i.e. stamped from sheet steel. Thus, the lower cab component 38 has its unitary, formed sheet metal lower member 46 provided with a rear wall 48, a floor 50, and a toe panel 52. The rear wall 48 has an upper end 54 and also has a lower end 56 from which the floor 50 extends forwardly from a rear end 58 to a front end 60 of the floor. Toe panel 52 of the lower member 46 has a lower end 62 connected to the front end 60 of the floor 50 and extending upwardly and forwardly to an upper end 64 thereof from its lower end.

Truck cab 32c illustrated in FIG. 19 also has its upper cab component 40 provided with a unitary, formed sheet metal upper member 66 having a roof 68, a pair of windshield pillars 70, and a cowl 72. The roof 68 has a rear end 74 from which the roof extends forwardly to a front end 76 thereof where the roof is connected at laterally spaced locations to upper ends 78 of the windshield pillars 70. These windshield pillars 70 extend downwardly from the laterally spaced upper ends thereof on opposite sides of windshield 80 to laterally spaced lower ends 82 of the pillars which are connected to the cowl 72.

Figures 20, 21:
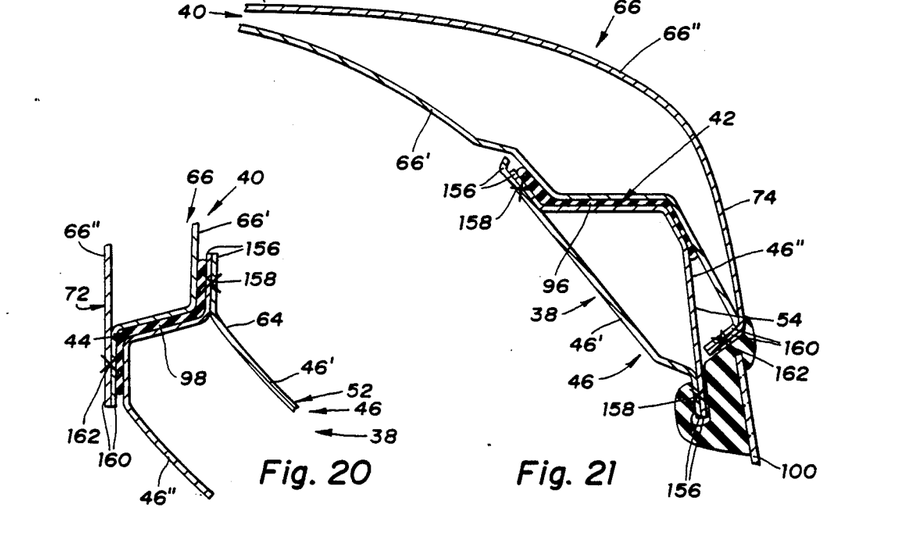
FIG. 20 is a sectional view that illustrates a lower connection between the lower and upper cab components.
FIG. 21 is a sectional view that illustrates an upper connection between the lower and upper cab components.

As illustrated in FIG. 21, an upper connection 42 connects the upper end 54 of the rear wall 48 of the lower cab component to the rear roof end 74 of the upper cab component. Likewise, as illustrated in FIG. 20, a lower connection 44 connects the upper end 64 of the toe panel 52 of the lower cab component to the cowl 72 of the upper cab component.

As illustrated in FIGS. 20 and 21, the lower cab component 38 preferably includes inner and outer unitary members 46' and 46" that are each formed from sheet metal and connected to each other to provide the rear wall 48, floor 50, and toe panel 52 of the lower cab component illustrated in FIG. 19. Likewise, the upper cab component 40 shown in FIG. 19 preferably is constructed as shown in FIGS. 20 and 21 with inner and outer unitary members 66' and 66" formed from sheet metal and connected to each other to provide the roof 68, pair of windshield pillars 70, and cowl 72.

As also illustrated in FIGS. 20 and 21, the inner and outer unitary members 46' and 46" of the lower cab component 38 preferably have flanges 156 that are secured to each other by welds 158 with other portions of these unitary members spaced from each other. Likewise, the inner and outer unitary members 66' and 66" of the upper cab component 40 have flanges 160 that are secured to each other by welds 162 with other portions of these unitary members spaced from each other. This spaced relationship of the unitary members of each cab component with the secured flanges thereof provides the requisite strength for the truck cab. Also, the upper and lower connections 42 and 44 between the lower and upper components 38 and 40 are disclosed as being provided by adhesive bonds 96 and 98 but could also be secured by other types of connections such as welding or fasteners, etc.

It should be appreciated that any suitable type of adhesive such as a polyurethane or an epoxy can be used for each embodiment of the truck cab to secure the lower and upper cab components to each other.

With each embodiment, the interior occupant compartment components can be installed prior to assembly of the lower and upper cab components to each other. More specifically, the carpet, seat, hardware, occupant restraints, wiring, steering column, and trim, etc. can be installed to the associated components prior to the securement of the components to each other. This substantially reduces assembly time and cost.

While the best modes for carrying out the invention have been described in detail, those familiar with the art to which this invention relates will recognize various alternative designs and embodiments for practicing the present invention as defined by the following claims.

What is claimed is:

1. A truck cab comprising:
    a lower cab component including a unitary, lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;
    an upper cab component including a unitary, upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;
    an upper connection that connects the upper end of the rear wall of the lower cab component to the rear end of the roof of the upper cab component; and
    a lower connection that connects the upper end of the toe panel of the lower cab component to the cowl of the upper cab component.

2. A truck cab comprising:
    a lower cab component including a unitary, resin transfer molded lower member having a rear wall, a floor, and a toe panel; said rear wall having an upper end and also having a lower end from which the floor extends forwardly from a rear end thereof to a front end thereof and said toe panel having a lower end connected to the front end of the floor and having an upper end to which the toe panel extends upwardly and forwardly from its lower end;
    an upper cab component including a unitary, resin transfer molded upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;
    an upper connection that connects the upper end of the rear wall of the lower cab component to the rear end of the roof of the upper cab component; and
    a lower connection that connects the upper end of the toe panel of the lower cab component to the cowl of the upper cab component.

3. A truck cab as in claim 2 wherein the upper and lower connections each comprise an adhesive bond that secures the resin transfer moldings to each other.

4. A truck cab as in claim 2 further including an outer roof panel that covers the roof of the upper cab component and has an outer finished surface.

5. A truck cab as in claim 4 wherein the outer roof panel is made from material selected from the group consisting of sheet metal and sheet molding compound.

6. A truck cab comprising:
    a lower cab component including a unitary, resin transfer molded lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;
    an upper cab component including a unitary, resin transfer molded upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;
    an upper connection including an adhesive bond that connects the upper end of the rear wall of the lower cab component to the rear end of the roof of the upper cab component;
    a lower connection including an adhesive bond that connects the upper end of the toe panel of the lower cab component to the cowl of the upper cab component; and
    an outer roof panel that covers the roof of the resin transfer molded upper cab component and has an outer finished surface.

7. A truck cab comprising:
    a lower cab component including a unitary, compression molded lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;

an upper cab component including a unitary, compression molded upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;

an upper connection that connects the upper end of the rear wall of the lower cab component to the rear end of the roof of the upper cab component; and a lower connection that connects the upper end of the toe panel of the lower cab component to the cowl of the upper cab component.

8. A truck cab as in claim 7 wherein the upper and lower connections each comprise an adhesive bond that secures the compression moldings to each other.

9. A truck cab as in claim 7 wherein the roof of the upper member includes strengthening ribs, and the truck cab further including an outer roof panel that covers the strengthening ribs and the roof of the upper cab component and has an outer finished surface.

10. A truck cab as in claim 9 wherein the outer roof panel also includes windshield pillar portions that cover the windshield pillars of the upper cab component, and the outer roof panel also including a cowl portion that connects the windshield pillar portions thereof and covers the cowl of the upper cab component.

11. A truck cab comprising:

a lower cab component including a unitary, compression molded lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;

an upper cab component including a unitary, compression molded upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;

an upper connection including an adhesive bond that connects the upper end of the rear wall of the lower cab component to the rear end of the roof of the upper cab component;

a lower connection including an adhesive bond that connects the upper end of the toe panel of the lower cab component to the cowl of the upper cab component; and an outer roof panel that covers the roof of the upper cab component and has a finished outer surface.

12. A truck cab comprising:

a lower cab component including a unitary, formed sheet metal lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;

an upper cab component including a unitary, formed sheet metal upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;

an upper connection that connects the upper end of the rear wall of the lower cab component to the rear end of the roof of the upper cab component; and a lower connection that connects the upper end of the toe panel of the lower cab component to the cowl of the upper cab component.

13. A truck cab as in claim 12 wherein the lower cab component includes inner and outer unitary members that are each formed from sheet metal and connected to each other to provide the rear wall, floor, and toe panel of the lower cab component; and the upper cab component including inner and outer unitary members formed from sheet metal and connected to each other to provide the roof, pair of windshield pillars, and cowl of the upper cab component.

14. A truck cab as in claim 13 wherein the inner and outer unitary members of the lower cab component having flanges that are engaged and secured to each other with other portions of these unitary members spaced from each other, and the inner and outer unitary members of the upper cab component having flanges that are engaged and secured to each other with other portions of these unitary members spaced from each other.

15. A truck cab as in claim 14 wherein the upper and lower connections each comprise an adhesive bond that secures the lower and upper formed sheet metal cab components to each other.

16. A truck cab comprising:

a lower cab component including inner and outer unitary, formed sheet metal lower members having flanges secured to each other and other portions spaced from each other to cooperatively define a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;

an upper cab component including inner and outer unitary, formed sheet metal upper members having flanges secured to each other and other portions spaced from each other to cooperatively define a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;

an upper connection that connects the upper end of the rear wall of the lower cab component to the rear end of the roof of the upper cab component; and a lower connection that connects the upper end of the toe panel of the lower cab component to the cowl of the upper cab component.

17. A vehicle body comprising:

a lower component including a unitary, lower member having a rear wall, a floor, and a toe panel; said rear wall having an upper end and also having a lower end from which the floor extends forwardly from a rear end thereof to a front end thereof; and said toe panel having a lower end connected to the front end of the floor and having an upper end to which the toe panel extends upwardly and forwardly from its lower end;

an upper component including a unitary, upper member having a roof, a pair of windshield pillars, and a cowl; said roof having a rear end from which the roof extends forwardly to a front end thereof where the roof is connected at laterally spaced locations to upper ends of the windshield pillars; and said windshield pillars extending downwardly from the laterally spaced upper ends thereof to laterally spaced lower ends thereof which are connected to the cowl;

an upper connection that connects the upper end of the rear wall of the lower component to the rear end of the roof of the upper component; and a lower connection that connects the upper end of the toe panel of the lower component to the cowl of the upper component.

* * * * *